(12) United States Patent
Wittkopp et al.

(10) Patent No.: US 7,837,591 B2
(45) Date of Patent: Nov. 23, 2010

(54) MULTI-SPEED TRANSMISSION

(75) Inventors: Scott H. Wittkopp, Ypsilanti, MI (US); James M. Hart, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 577 days.

(21) Appl. No.: 11/853,324

(22) Filed: Sep. 11, 2007

(65) Prior Publication Data
US 2008/0085805 A1    Apr. 10, 2008

Related U.S. Application Data

(60) Provisional application No. 60/828,663, filed on Oct. 9, 2006.

(51) Int. Cl.
*F16H 3/62* (2006.01)
(52) U.S. Cl. ..................................... 475/317
(58) Field of Classification Search .................. 475/317, 475/290
See application file for complete search history.

(56) References Cited

U.S. PATENT DOCUMENTS

| | | |
|---|---|---|
| 6,558,287 B2 | 5/2003 | Hayabuchi |
| 6,634,981 B1 | 10/2003 | Raghavan |
| 6,648,790 B2 | 11/2003 | Raghavan |
| 6,659,903 B1 | 12/2003 | Bucknor |
| 6,659,904 B1 | 12/2003 | Usoro |
| 6,709,360 B2 | 3/2004 | Raghavan |
| 6,746,360 B2 | 6/2004 | Bucknor |
| 6,887,178 B2 | 5/2005 | Miyazaki |
| 6,910,985 B2 | 6/2005 | Ishimaru |
| 6,913,556 B2 | 7/2005 | Armstrong |
| 6,923,742 B2 | 8/2005 | Armstrong |
| 6,929,576 B2 | 8/2005 | Armstrong |
| 6,949,048 B2 | 9/2005 | Bucknor |
| 6,960,150 B2 | 11/2005 | Armstrong |
| 6,962,548 B2 | 11/2005 | Bucknor |
| 7,014,590 B2 | 3/2006 | Stevenson |
| 7,029,416 B2 | 4/2006 | Miyazaki |
| 7,033,299 B2 | 4/2006 | Bucknor |
| 7,059,995 B2 | 6/2006 | Stevenson |
| 7,074,153 B2 | 7/2006 | Usoro |
| 7,081,066 B2 | 7/2006 | Raghavan |
| 7,094,173 B2 | 8/2006 | Raghavan |
| 7,101,303 B2 | 9/2006 | Tiesler |
| 7,101,305 B2 | 9/2006 | Tabata |
| 7,104,915 B2 | 9/2006 | Tiesler |
| 7,115,061 B2 | 10/2006 | Tiesler |
| 7,115,063 B2 | 10/2006 | Tiesler |
| 7,118,509 B2 | 10/2006 | Tabata |
| 7,118,510 B2 | 10/2006 | Raghavan |
| 7,118,511 B2 | 10/2006 | Tiesler |
| 7,137,923 B2 | 11/2006 | Tiesler |
| 7,150,695 B2 | 12/2006 | Usoro |
| 7,150,696 B2 | 12/2006 | Bucknor |
| 7,156,767 B2 | 1/2007 | Tiesler |
| 7,156,768 B2 | 1/2007 | Gumpoltsberger |

(Continued)

*Primary Examiner*—Sherry L Estremsky
*Assistant Examiner*—Erin D Bishop

(57) ABSTRACT

A transmission is provided having an input member, an output member, three planetary gear sets, a plurality of coupling members and a plurality of torque transmitting devices. Each of the planetary gear sets includes a sun gear member, a planet carrier member, and a ring gear member. The torque transmitting devices include clutches and brakes arranged within a transmission housing.

23 Claims, 9 Drawing Sheets

U.S. PATENT DOCUMENTS

| | | |
|---|---|---|
| 2004/0082425 A1* | 4/2004 | Lee et al. .................... 475/276 |
| 2005/0282680 A1 | 12/2005 | Soh |
| 2006/0068965 A1 | 3/2006 | Gumpoltsberger |
| 2007/0010367 A1 | 1/2007 | Raghavan |
| 2007/0010369 A1 | 1/2007 | Bucknor |
| 2007/0010370 A1 | 1/2007 | Raghavan |

* cited by examiner

MULTI-SPEED TRANSMISSION

CROSS-REFERENCE TO RELATED APPLICATIONS

This application claims the benefit of U.S. Provisional Application No. 60/828,663, filed on Oct. 9, 2006. The disclosure of the above application is incorporated herein by reference.

TECHNICAL FIELD

The invention relates generally to a multiple speed transmission having a plurality of planetary gear sets and a plurality of torque transmitting devices and more particularly to a transmission having eight or more speeds, three planetary gear sets and a plurality of torque transmitting devices.

BACKGROUND

Automatic power transmissions are currently in wide spread use in passenger vehicles and trucks. As is well known, the automatic transmission provides a plurality of speed ratios in both the forward direction and at least one reverse speed ratio. The speed ratios are established through the use of a plurality of planetary gearsets. The engagement of the gearsets is controlled by a number of fluid-operated torque-transmitting mechanisms, commonly termed clutches and brakes.

It has become a standard to provide at least four forward speed ratios in automatic transmissions for use in passenger vehicles. More recently, automobile manufacturers have increased the forward speed ratios to six and in some instances seven or eight. This, of course, requires the addition of planetary gearsets. However, it is desirable to minimize the number of torque-transmitting mechanisms to reduce cost and overall size of the transmission.

A number of the currently proposed eight speed planetary transmissions provide three planetary gearsets and five torque-transmitting mechanisms. One problem facing transmission designers and manufacturers is the packaging of the planetary gearsets and the torque-transmitting mechanisms. It is preferable to arrange the gearsets and torque-transmitting mechanisms in a way that minimizes the overall size of the transmission as well as reduces manufacturing complexity.

Thus, there is a need for a new and improved multi-speed transmission. The arrangement of the gearsets and the torque-transmitting mechanisms of the transmission should minimize the size and manufacturing complexity of the transmission.

DESCRIPTION OF THE PREFERRED EMBODIMENTS

Figure 1:
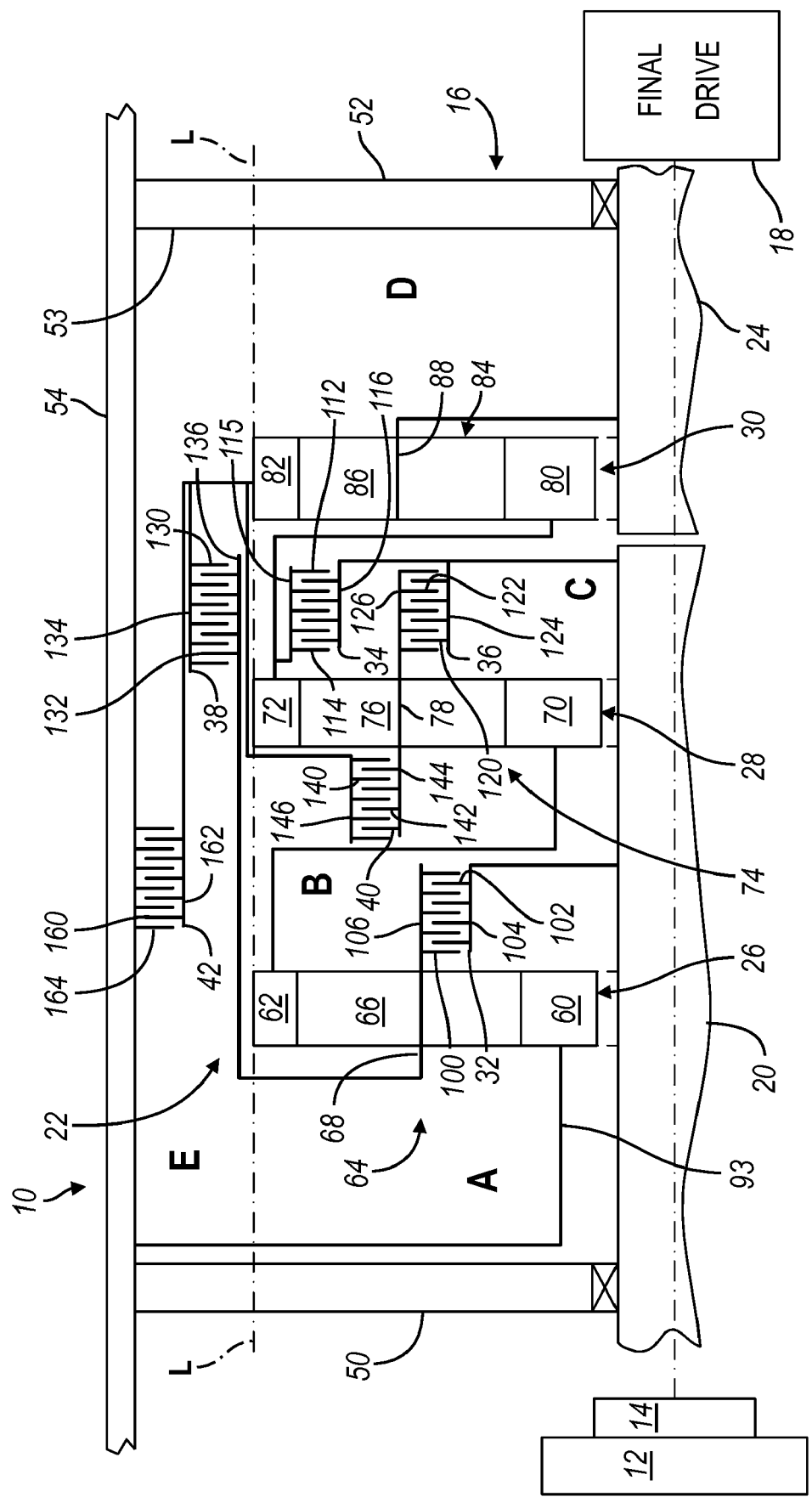
FIG. 1 is a diagrammatic representation of a cross-section of a multi-speed transmission, in accordance with an embodiment of the present invention.

Referring to the drawings, wherein like characters represent the same or corresponding parts throughout the several views, there is seen in FIG. 1 a powertrain 10 having an internal combustion engine or electric motor 12, a torque converter or flywheel 14, a transmission 16, and a final drive mechanism 18.

The transmission 16 includes an input shaft or member 20, a planetary gear arrangement 22, and an output shaft or member 24. The planetary gear arrangement 22 includes three planetary gearsets 26, 28, and 30, and six selectively-engageable torque-transmitting mechanisms 32, 34, 36, 38, 40 and 42. The input shaft 20 is drivingly connected with a conventional turbine disposed within the torque converter 14. The output shaft 24 is drivingly connected with the final drive mechanism 18. As is well known in the art of vehicle transmissions, the final drive mechanism 18 provides output shafts to drive the wheels of a vehicle.

The transmission 16 has a first end wall 50, a second end wall 52, and a housing 54. Housing 54 interconnects between the first and second end walls 50 and 52 to provide a space or cavity 53 in which the planetary gearsets 26, 28, and 30 and the torque-transmitting mechanisms 32, 34, 36, 38, 40 and 42 are located. Further, cavity 53 has a plurality of zones A, B, C, D and E in which the plurality of torque transmitting mechanisms 32, 34, 36, 38, 40 and 42 will be specifically positioned, in accordance with the preferred embodiments of the present invention.

As shown in FIG. 1 and throughout the several views, Zone A is defined by the area or space bounded: axially on the left by first end wall 50, axially on the right by planetary gearset 26, radially inward by input shaft 20 and radially outward by reference line "L" which is a longitudinal line that extends adjacent the planetary gearsets; Zone B is defined by the area bounded: axially on the left by planetary gearset 26, axially on the right by planetary gearset 28, radially inward by input shaft 20 and radially outward by reference line "L"; Zone C is defined by the area bounded: axially on the left by planetary gearset 28, axially on the right by planetary gearset 30, radially inward by input shaft 20 and radially outward by reference line "L"; Zone D is defined by the area bounded: axially on the left by planetary gearset 30, axially on the right by second end wall 52, radially inward by input shaft 20 and radially outward by reference line "L"; and Zone E is defined by the area bounded: axially on the left by first end wall 50, axially on the right by second end wall 52, radially inward by reference line "L" and radially outward by housing 54. While reference line "L" is illustrated as a straight line throughout the several views, it should be appreciated that reference line "L" follows the outer periphery of the planetary gear sets 26, 28, and 30, and accordingly may be stepped or non-linear depending on the radial location of the outer periphery of each of the planetary gear sets 26, 28, 30. As will be described and illustrated hereinafter, planetary gearsets 26, 28 and 30 will change positions within transmission cavity 53, however, the zones described above will not change they will remain the same as shown throughout the Figures.

The planetary gearset 26 includes a sun gear member 60, a ring gear member 62, and a planet carrier assembly member 64. The planet carrier assembly member 64 includes a plurality of pinion gears 66 rotatably mounted on a planet carrier member 68 and disposed in meshing relationship with both the sun gear member 60 and the ring gear member 62.

The planetary gearset 28 includes a sun gear member 70, a ring gear member 72, and a planet carrier assembly member 74. The planet carrier assembly member 74 includes a plurality of pinion gears 76 rotatably mounted on a planet carrier member 78 and disposed in meshing relationship with both sun gear member 70 and ring gear member 72.

The planetary gearset 30 includes a sun gear member 80, a ring gear member 82, and a planet carrier assembly member 84. The planet carrier assembly member 84 includes a plurality of pinion gears 86 rotatably mounted on a planet carrier member 88 and disposed in meshing relationship with both the sun gear member 80 and the ring gear member 82.

The sun gear member 60 is continuously connected with housing 54 through a shaft 93 that traverses zones A and E. Planet carrier member 88 is continuously drivingly connected with output shaft 24. Further, ring gear member 62 is drivingly connected to sun gear member 70 and ring gear member 72 is drivingly connected to sun gear member 80.

The torque-transmitting mechanism 32 may include a servomechanism (not shown), which has a selectively-operable piston (not shown) supported in a housing and adapted to engage one of a plurality of friction discs or reaction plates 100. The reaction plates 100 are disposed to frictionally engage a plurality of friction discs or reaction plates 102 when the torque-transmitting mechanism 32 is engaged. The reaction plates 100 when engaged by the piston will engage the plurality of friction discs 102 to form a frictional engagement between a hub 104 drivingly connected with the input shaft 20 and housing 106 connected with planet carrier member 68. When the torque-transmitting mechanism 32 is engaged, input shaft 20 will be drivingly connected with planet carrier member 68.

The torque-transmitting mechanism 34 may also include a servomechanism (not shown), which includes a selectively-operable piston (not shown) supported in a housing and adapted to engage one of a plurality of friction discs or reaction plates 112 mounted to housing 115. Housing 115 is coupled to ring gear member 72. Reaction plates 112 when engaged by the piston will engage a plurality of friction discs or reaction plates 114 to form a frictional engagement between housing 115 and a hub 116 drivingly connected with input shaft 20. When the torque-transmitting mechanism 34 is engaged, the input shaft 20 will be drivingly connected with the ring gear member 72 and sun gear member 80.

The torque-transmitting mechanism 36 may also include a servomechanism (not shown) having a selectively-engageable fluid-operated piston (not shown). The piston (not shown) is adapted to engage one of a plurality of friction discs or reaction plates 120, which when engaged, will frictionally engage a plurality of friction discs or reaction plates 122. The reaction plates 120 are connected through a hub 124 with the input shaft 20 and friction discs 122 are connected through a hub 126 with planet carrier member 78. When the torque-transmitting mechanism 36 is engaged, planet carrier member 78 will be drivingly connected with the input shaft 20.

The torque-transmitting mechanism 38 may also include a servomechanism (not shown) having a selectively-engageable fluid-operated piston (not shown), which is adapted to engage one of a plurality of friction discs or reaction plates 130. When the reaction plates 130 are engaged by the piston, they will frictionally engage a plurality of friction discs or reaction plates 132. The reaction plates 130 are drivingly connected with a hub 134, which is continuously drivingly connected with ring gear member 82 and friction discs 132 are drivingly connected with a hub 136, which is continuously drivingly connected with planet carrier member 68. When the torque-transmitting mechanism 38 is engaged, planet carrier member 68 and ring gear member 82 will be drivingly connected.

The torque-transmitting mechanism 40 may also include a servomechanism (not shown) having a selectively-engageable fluid-operated piston (not shown), which is adapted to engage one of a plurality of friction discs or reaction plates 140. When the reaction plates 140 are engaged by the piston, they will frictionally engage a plurality of friction discs or reaction plates 142. The reaction plates 140 are drivingly connected with a hub 146, which is continuously drivingly connected with ring gear member 82 and friction discs 142 are drivingly connected with a housing 144, which is continuously drivingly connected with planet carrier member 78. When the torque-transmitting mechanism 40 is engaged, planet carrier member 78 and ring gear member 82 will be drivingly connected.

The torque-transmitting mechanism 42 includes a plurality of friction discs or reaction plates 160 fixed to a hub 162. When torque-transmitting mechanism 42 is engaged, reaction plates 160 will frictionally engage a plurality of friction discs or reaction plates 164. The reaction plates 160 are drivingly connected with a hub 162, which is continuously drivingly connected with ring gear member 82 and reaction 164 are connected to housing 54. When the torque-transmitting mechanism 42 is engaged, ring gear member 82 will be held stationary relative to housing 54

From the above description, those skilled in the art will recognize that the torque-transmitting mechanisms 32, 34, 36, 38 and 40 are clutch mechanisms and the torque-transmitting mechanism 42 is a brake mechanism. In the engineering field, the disc-type brakes are commonly termed reaction clutches and the clutch mechanisms are referred to as rotary clutches. The transmission 16 will provide eight forward speed ratios and one reverse speed ratio between the engine 12, the torque converter 14, and the final drive mechanism 18.

As shown in FIG. 1, planetary gearset 26 is disposed closest to wall 50 and planetary gearset 30 is disposed closest to wall 52. Planetary gearset 28 is disposed between planetary gearset 26 and 30. Torque-transmitting mechanisms 32, 40 are disposed in zone "B". Further, torque-transmitting mechanisms 34 and 36 are disposed in zone "C". The torque-transmitting mechanisms 38, 42 are disposed in zone "E". This makes for a fairly compact longitudinal power transmission. Alternatively, the present invention contemplates that torque-transmitting mechanisms 32, 34, 36, 38, 40 and 42, are disposed in the other zones as shown in chart (I) below, in accordance with the embodiments of the present invention. An "X" in the chart shown below indicates that the particular clutch is positionable in any of the referenced Zones and an "O" indicates that the particular gear is not to be located in the referenced Zones.

CHART I

| TORQUE TRANSMITTING MECHANISM | ZONES | | | | |
|---|---|---|---|---|---|
| | A | B | C | D | E |
| 32 | X | X | X | O | O |
| 34 | X | X | X | O | O |
| 36 | X | X | X | O | O |
| 38 | X | X | X | X | X |
| 40 | O | X | X | X | X |
| 42 | X | X | X | X | X |

Figure 2:
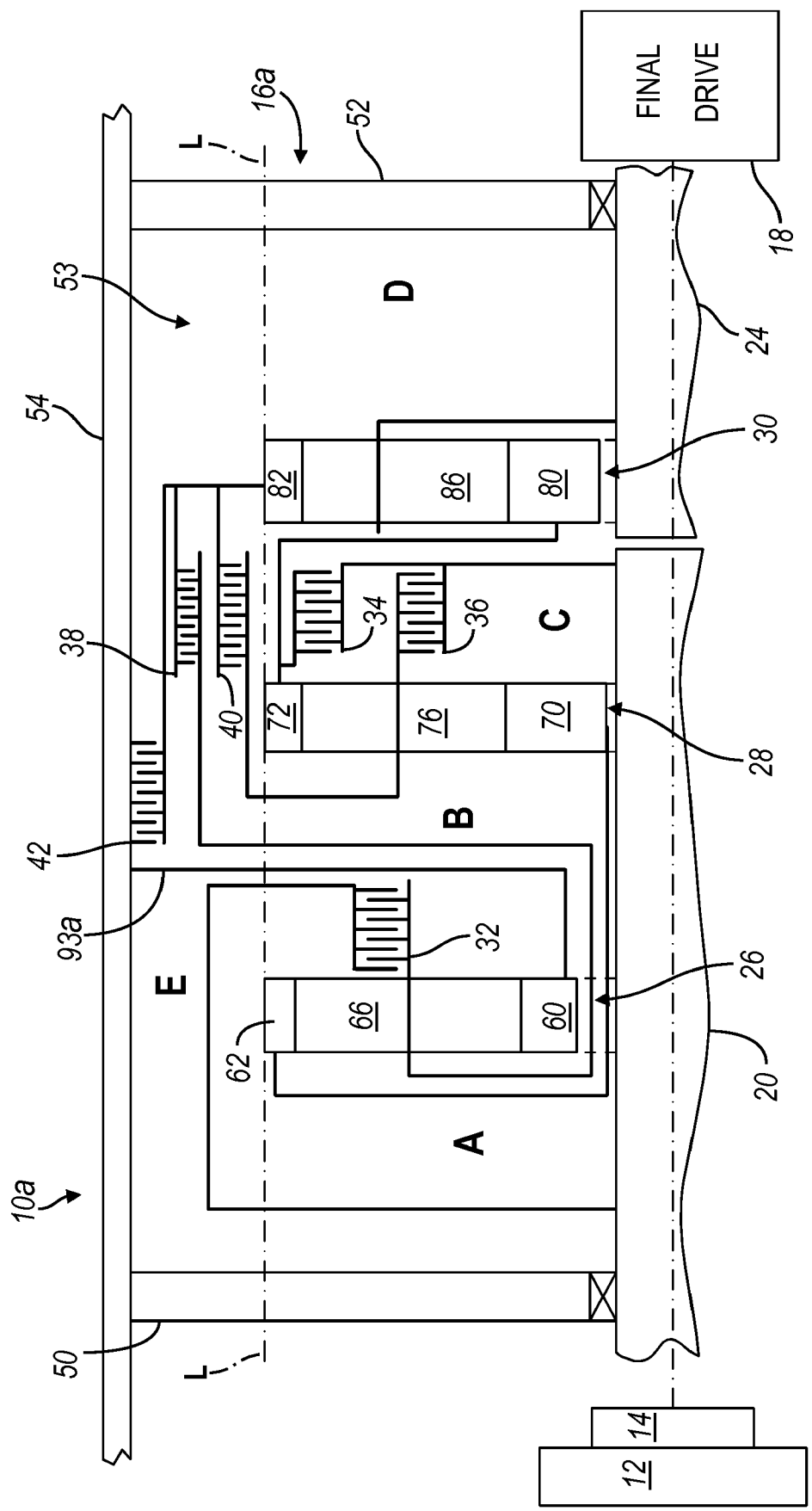
FIG. 2 is a diagrammatic representation of a cross-section of a multi-speed transmission, in accordance with an embodiment of the present invention.

In an alternate embodiment of the present invention, a powertrain 10A is shown in FIG. 2. The corresponding components have been given the same numerical designation. Powertrain 10A includes a transmission 16A that has sun gear member 60 that is continuously connected with housing 54 through a shaft 93A that traverses zones B and E. Further, as shown in FIG. 2, torque-transmitting mechanism 32 is disposed in zone "B". Further, torque-transmitting mechanisms 34 and 36 are disposed in zone "C". The torque-transmitting mechanisms 38, 40 and 42 are disposed in zone "E". This makes for a fairly compact longitudinal power transmission. Alternatively, the present invention contemplates that torque-transmitting mechanisms 32, 34, 36, 38, 40 and 42, are disposed in the other zones as shown in chart (II) below, in accordance with the embodiments of the present invention. An "X" in the chart shown below indicates that the particular clutch is positionable in any of the referenced Zones and an "O" indicates that the particular gear is not to be located in the referenced Zones.

CHART II

| TORQUE TRANSMITTING MECHANISM | ZONES | | | | |
|---|---|---|---|---|---|
| | A | B | C | D | E |
| 32 | X | X | O | O | X |
| 34 | X | X | X | X | O |
| 36 | X | X | X | O | O |
| 38 | X | X | X | X | X |
| 40 | O | X | X | X | X |
| 42 | O | X | X | X | X |

Figure 3:
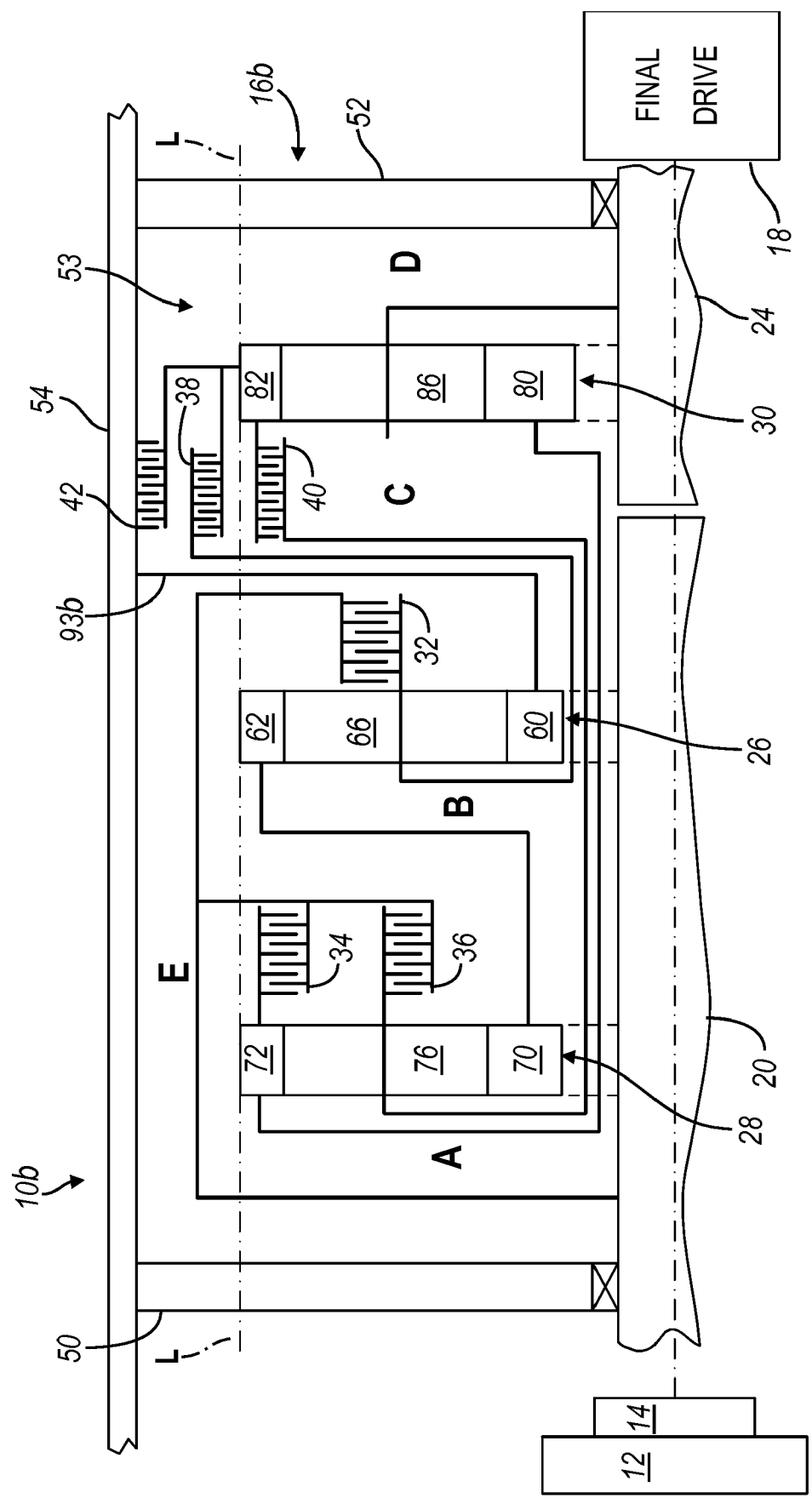
FIG. 3 is a diagrammatic representation of a cross-section of a multi-speed transmission, in accordance with an embodiment of the present invention.

In an alternate embodiment of the present invention, a powertrain 10B, shown in FIG. 3, incorporates the transmission 16B, which includes the planetary gearsets 26, 28, and 30 and the torque-transmitting mechanisms 32, 34, 36, 38, 40 and 42. Planetary gearset 28 is disposed closest to wall 50 and planetary gearset 30 is disposed closest to wall 52. Planetary gearset 26 is disposed between planetary gearset 28 and 30. Those torque-transmitting mechanisms that are identical with FIG. 1 have the same numerical designation.

As shown in FIG. 3, sun gear member 60 is continuously connected with housing 54 through shaft 93B that traverses zones C and E. Further, torque-transmitting mechanisms 32 and 40 are disposed in zone "C". Torque-transmitting mechanisms 34 and 36 are disposed in zone "B". Torque-transmitting mechanisms 38 and 42 are disposed in zone "E". This makes for a fairly compact longitudinal power transmission.

Alternatively, the present invention contemplates that torque-transmitting mechanisms 32, 34, 36, 38, 40 and 42, are disposed in the other zones as shown in chart (III) below, in accordance with the embodiments of the present invention. An "X" in the chart shown below indicates that the particular clutch is positionable in any of the referenced Zones and an "O" indicates that the particular gear is not to be located in the referenced Zones.

CHART III

| TORQUE TRANSMITTING MECHANISM | ZONES | | | | |
|---|---|---|---|---|---|
| | A | B | C | D | E |
| 32 | X | X | X | O | X |
| 34 | X | X | O | O | X |
| 36 | X | X | X | O | X |
| 38 | O | X | X | O | X |
| 40 | X | X | X | O | X |
| 42 | O | O | X | X | X |

Figure 4:
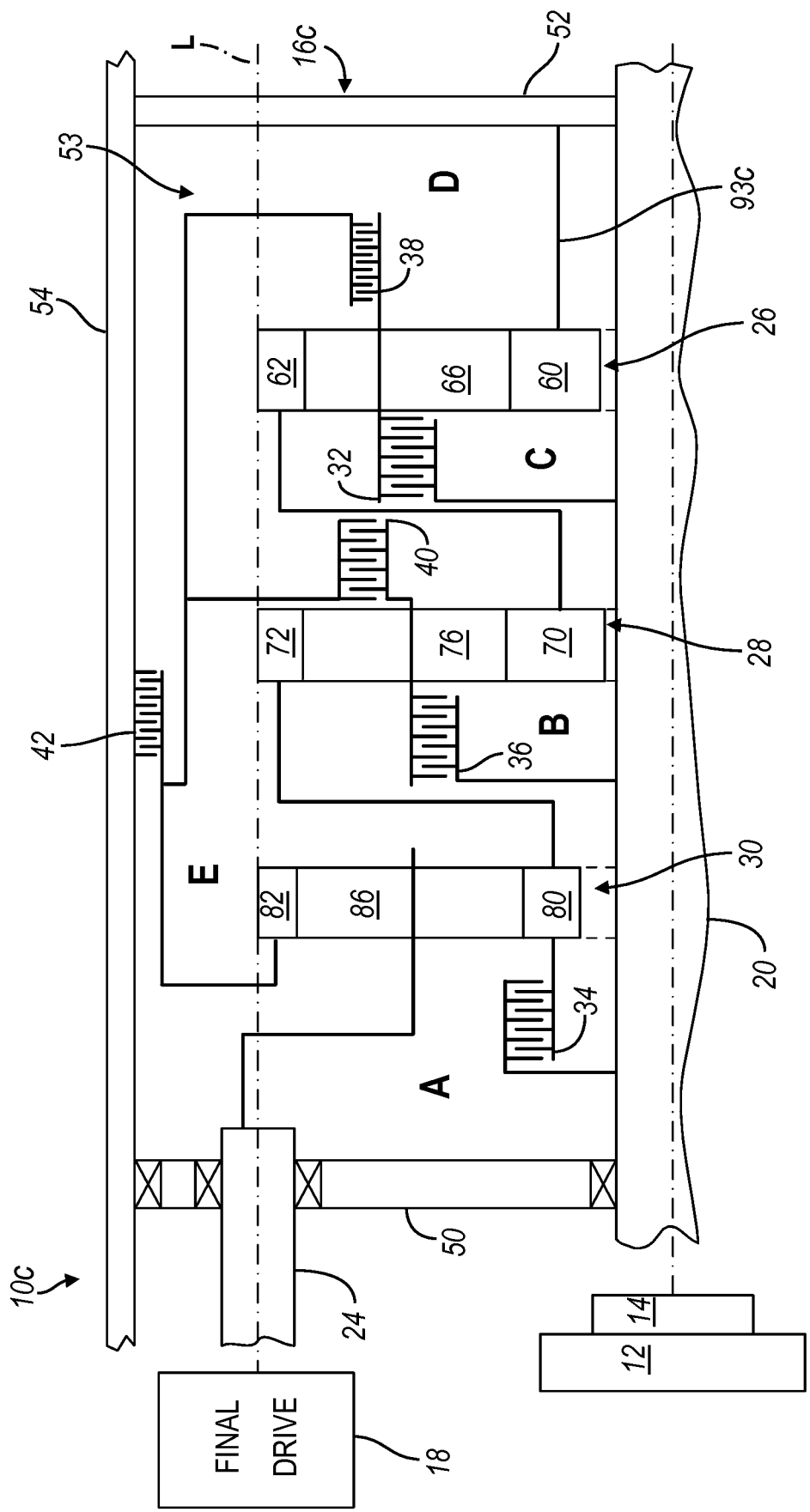
FIG. 4 is a diagrammatic representation of a cross-section of a multi-speed transmission, in accordance with an embodiment of the present invention.

In an alternate embodiment of the present invention, a powertrain 10C is shown in FIG. 4. The input and output shafts 20, 24 are supported through end wall 50 to provide a transmission for a front wheel drive vehicle. The corresponding components have been given the same numerical designation. Powertrain 10C, shown in FIG. 4, incorporates a transmission 16C, which includes the planetary gearsets 26, 28, and 30 and the torque-transmitting mechanisms 32, 34, 36, 38, 40 and 42. Planetary gearset 30 is disposed closest to wall 50 and planetary gearset 26 is disposed closest to wall 52. Planetary gearset 28 is disposed between planetary gearset 26 and 30. Those torque-transmitting mechanisms that are identical with FIG. 1 have the same numerical designation.

As shown in FIG. 4, sun gear member 60 is continuously connected with end wall 52 through a shaft 93C that traverses only zone D. Alternatively, shaft 93C could pass through zone D and connect to housing 54. Further, torque-transmitting mechanism 34 is disposed in zone "A". Torque-transmitting mechanism 36 is disposed in zone "B". The torque-transmitting mechanisms 32 and 40 are disposed in zone "C". The torque-transmitting mechanism 38 is disposed in zone "D". The torque-transmitting mechanism 42 is disposed in zone "E". This makes for a fairly compact transverse power transmission.

Alternatively, the present invention contemplates that torque-transmitting mechanisms 32, 34, 36, 38, 40 and 42, are disposed in the other zones as shown in chart (IV) below, in accordance with the embodiments of the present invention. An "X" in the chart shown below indicates that the particular clutch is positionable in any of the referenced Zones and an "O" indicates that the particular gear is not to be located in the referenced Zones.

CHART IV

| TORQUE TRANSMITTING MECHANISM | ZONES | | | | |
|---|---|---|---|---|---|
| | A | B | C | D | E |
| 32 | X | X | X | X | O |
| 34 | X | X | O | O | O |
| 36 | X | X | X | O | O |
| 38 | O | X | X | X | X |
| 40 | O | X | X | X | X |
| 42 | X | X | X | X | X |

Figure 5:
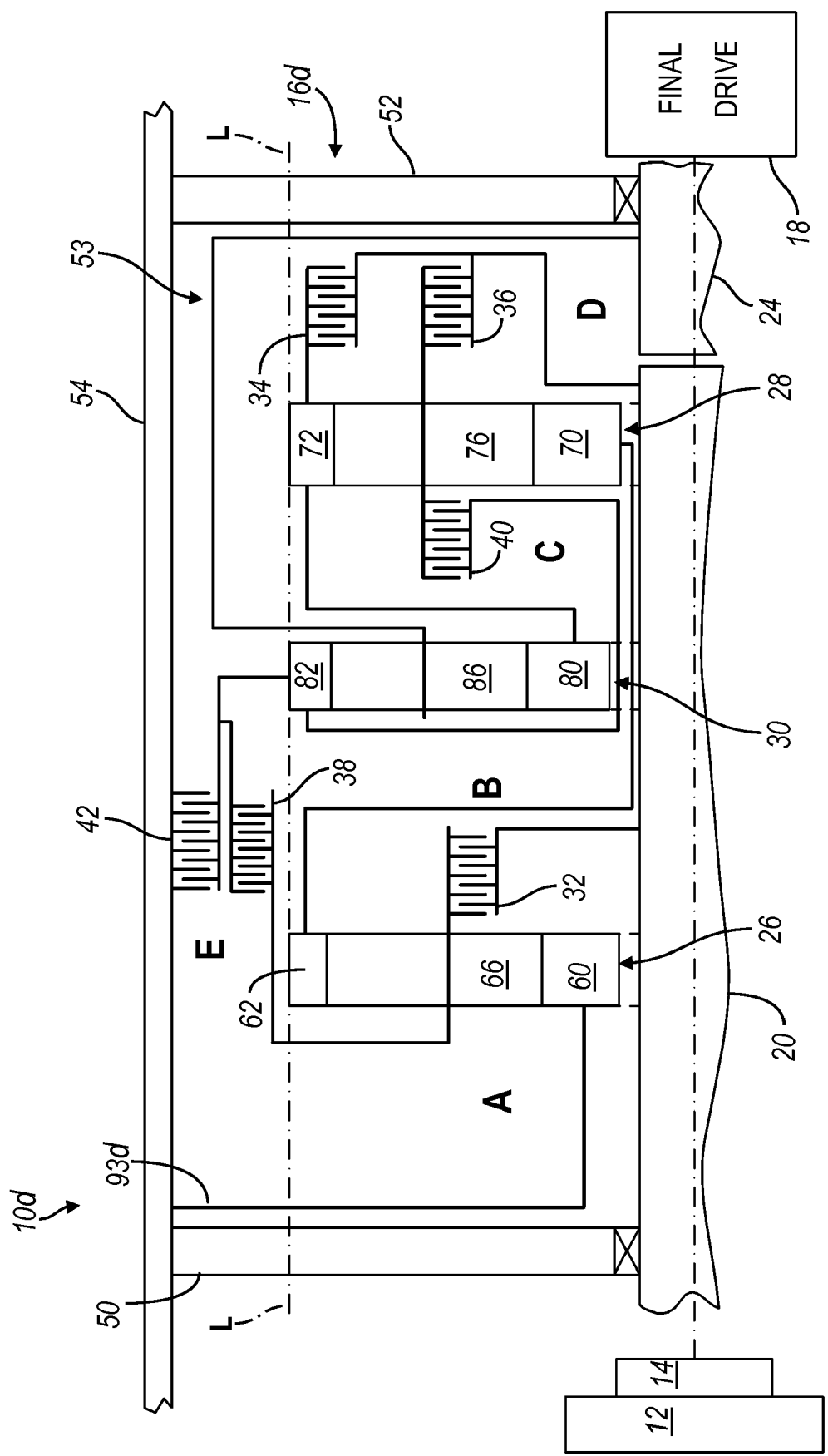
FIG. 5 is a diagrammatic representation of a cross-section of a multi-speed transmission, in accordance with an embodiment of the present invention.

In an alternate embodiment of the present invention, a powertrain 10D shown in FIG. 5, which incorporates a transmission 16D. Transmission 16D includes the planetary gearsets 26, 28, and 30 and the torque-transmitting mechanisms 32, 34, 36, 38, 40 and 42. Planetary gearset 26 is disposed closest to wall 50 and planetary gearset 28 is disposed closest to wall 52. Planetary gearset 30 is disposed between planetary gearset 26 and 28. Those torque-transmitting mechanisms that are identical with FIG. 1 have the same numerical designation.

As shown in FIG. 5, sun gear member 60 is continuously connected with housing 54 through a shaft 93D that traverses only zone A & E. Alternatively, shaft 93D could traverse through Zone A only and connect to side wall 50. Further, torque-transmitting mechanism 32 is disposed in zone "B". Torque-transmitting mechanism 40 is disposed in zone "C". The torque-transmitting mechanisms 34 and 36 are disposed in zone "D". The torque-transmitting mechanisms 38 and 42 are disposed in zone "E". This makes for a fairly compact longitudinal power transmission.

Alternatively, the present invention contemplates that torque-transmitting mechanisms 32, 34, 36, 38, 40 and 42, are disposed in the other zones as shown in chart (V) below, in accordance with the embodiments of the present invention. An "X" in the chart shown below indicates that the particular clutch is positionable in any of the referenced Zones and an "O" indicates that the particular gear is not to be located in the referenced Zones.

CHART V

| TORQUE TRANSMITTING MECHANISM | ZONES | | | | |
| --- | --- | --- | --- | --- | --- |
|  | A | B | C | D | E |
| 32 | X | X | X | O | O |
| 34 | X | X | X | X | X |
| 36 | X | X | X | X | X |
| 38 | X | X | O | O | X |
| 40 | O | X | X | O | O |
| 42 | X | X | X | X | X |

Figure 6:
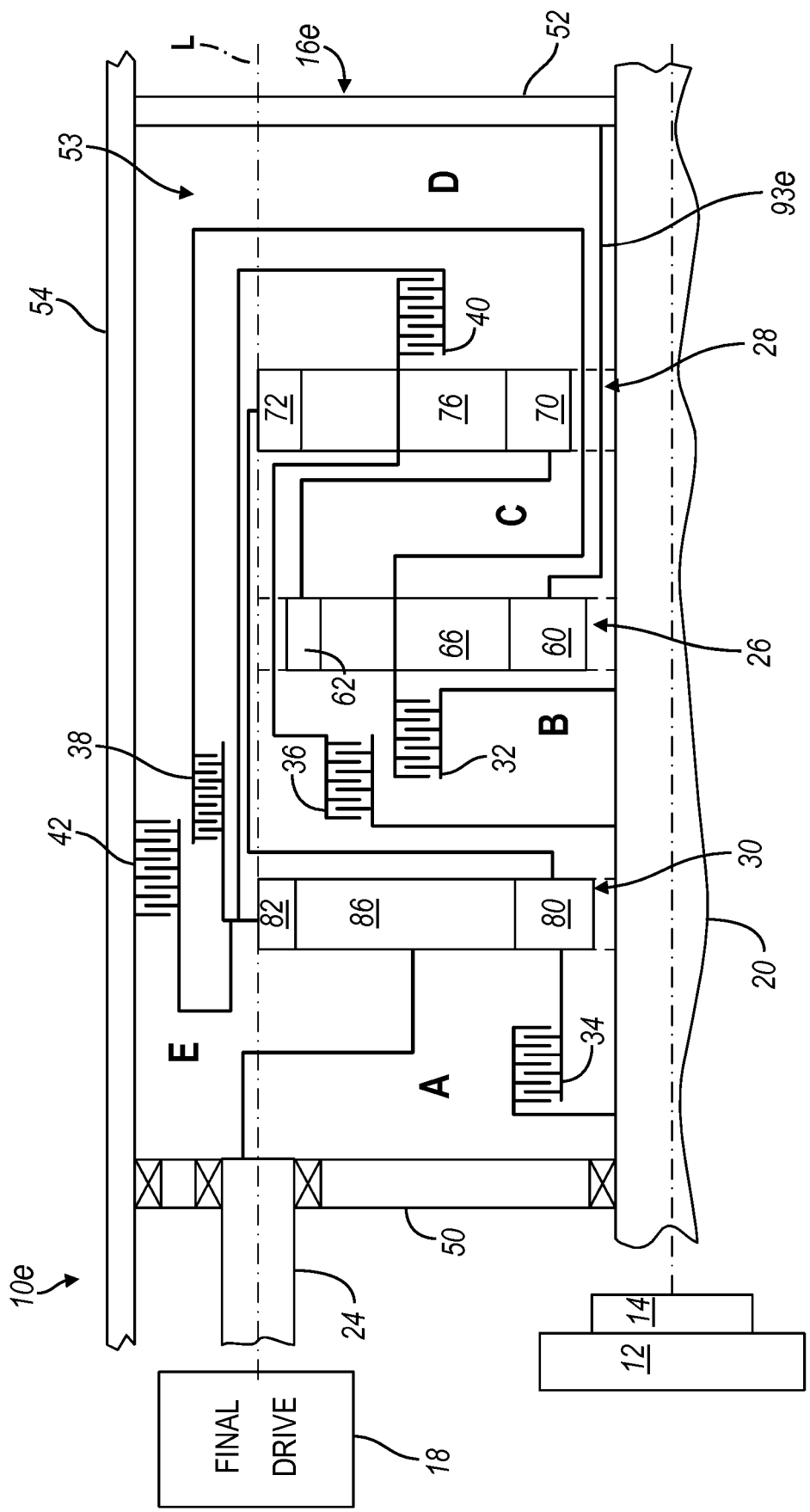
FIG. 6 is a diagrammatic representation of a cross-section of a multi-speed transmission, in accordance with an embodiment of the present invention.

In an alternate embodiment of the present invention, a powertrain 10E shown in FIG. 6, incorporates a transmission 16E. The input and output shafts 20, 24 of transmission 16E are supported through end wall 50 to provide a transmission for a front wheel drive vehicle. Transmission 16E includes the planetary gearsets 26, 28, and and the torque-transmitting mechanisms 32, 34, 36, 38, 40 and 42. Planetary gearset 30 is disposed closest to end wall 50 and planetary gearset 28 is disposed closest to wall 52. Planetary gearset 26 is disposed between planetary gearset 28 and 30. Those torque-transmitting mechanisms that are identical with FIG. 1 have the same numerical designation.

As shown in FIG. 6, sun gear member 60 is continuously connected with end wall 52 through a shaft 93E that traverses zones C and D. Further, torque-transmitting mechanism 34 is disposed in zone "A". The torque-transmitting mechanisms 32 and 36 are disposed in zone "B". Further, torque-transmitting mechanism 40 is disposed in zone "D". The torque-transmitting mechanisms 38 and 42 are disposed in zone "E". This makes for a fairly compact transverse power transmission.

Alternatively, the present invention contemplates that torque-transmitting mechanisms 32, 34, 36, 38, 40 and 42, are disposed in the other zones as shown in chart (VI) below, in accordance with the embodiments of the present invention. An "X" in the chart shown below indicates that the particular clutch is positionable in any of the referenced Zones and an "O" indicates that the particular gear is not to be located in the referenced Zones.

CHART VI

| TORQUE TRANSMITTING MECHANISM | ZONES | | | | |
| --- | --- | --- | --- | --- | --- |
|  | A | B | C | D | E |
| 32 | X | X | O | O | O |
| 34 | X | X | O | O | O |
| 36 | X | X | X | O | O |
| 38 | X | X | X | X | X |
| 40 | O | X | X | X | X |
| 42 | X | X | O | O | X |

Figure 7:
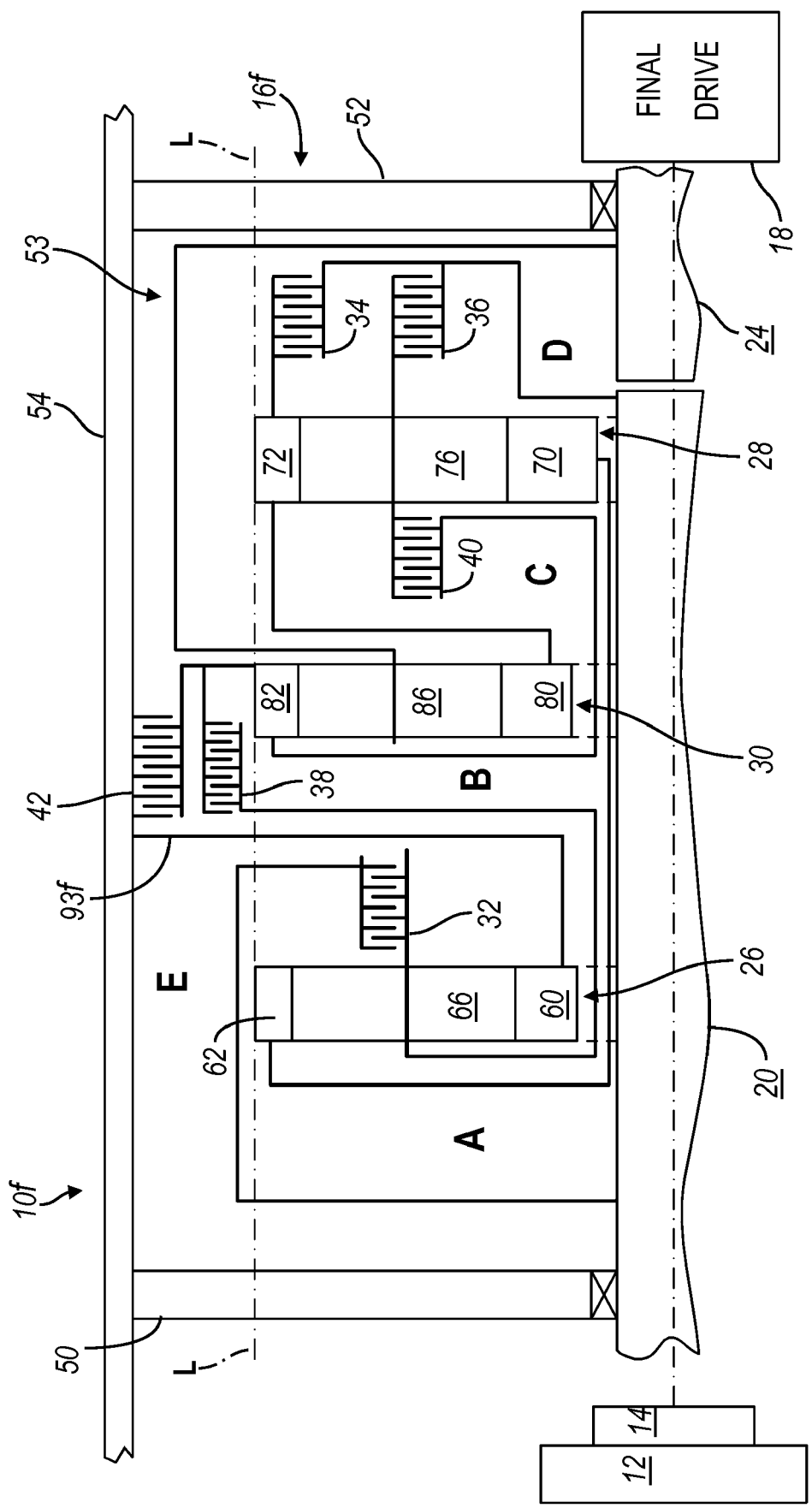
FIG. 7 is a diagrammatic representation of a cross-section of a multi-speed transmission, in accordance with an embodiment of the present invention.

In an alternate embodiment of the present invention, a powertrain 10F shown in FIG. 7, incorporates a transmission 16F, which includes the planetary gearsets 26, 28, and 30 and the torque-transmitting mechanisms 32, 34, 36, 38, 40 and 42. Planetary gearset 26 is disposed closest to wall 50 and planetary gearset 28 is disposed closest to wall 52. Planetary gearset 30 is disposed between planetary gearset 26 and 28. Those torque-transmitting mechanisms that are identical with FIG. 1 have the same numerical designation.

As shown in FIG. 7, sun gear member 60 is continuously connected with housing 54 through a shaft 93F that traverses zones B and E. Further, torque-transmitting mechanism 32 is disposed in zone "B". The torque-transmitting mechanism 40 is disposed in zone "C". Further, torque-transmitting mechanisms 34 and 36 are disposed in zone "D". The torque-transmitting mechanisms 38 and 42 are disposed in zone "E". This makes for a fairly compact longitudinal transmission.

Alternatively, the present invention contemplates that torque-transmitting mechanisms 32, 34, 36, 38, 40 and 42, are disposed in the other zones as shown in chart (VII) below, in accordance with the embodiments of the present invention. An "X" in the chart shown below indicates that the particular clutch is positionable in any of the referenced Zones and an "O" indicates that the particular gear is not to be located in the referenced Zones.

CHART VII

| TORQUE TRANSMITTING MECHANISM | ZONES | | | | |
| --- | --- | --- | --- | --- | --- |
|  | A | B | C | D | E |
| 32 | X | X | O | O | X |
| 34 | X | O | O | X | X |
| 36 | X | O | O | X | X |
| 38 | X | X | O | O | X |
| 40 | O | X | X | O | X |
| 42 | O | X | X | O | X |

Figure 8:
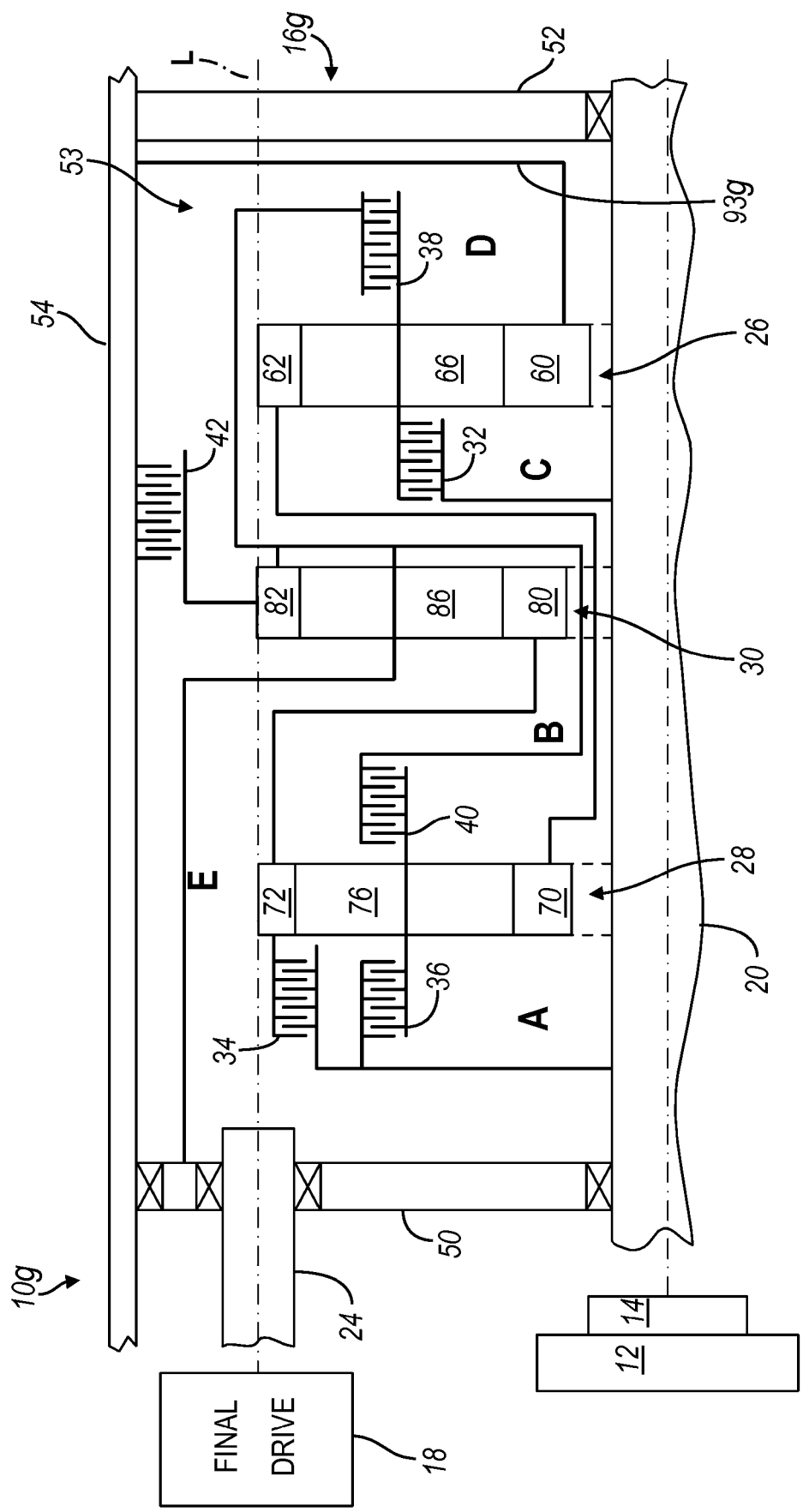
FIG. 8 is a diagrammatic representation of a cross-section of a multi-speed transmission, in accordance with an embodiment of the present invention.

In an alternate embodiment of the present invention, a powertrain 10G shown in FIG. 8, incorporates a transmission 16G. The input and output shafts 20, 24 of transmission 16G are supported through end wall 50 to provide a transmission for a front wheel drive vehicle. Transmission 16G includes the planetary gearsets 26, 28, and 30 and the torque-transmitting mechanisms 32, 34, 36, 38, 40 and 42. Planetary gearset 28 is disposed closest to wall 50 and planetary gearset 26 is disposed closest to wall 52. Planetary gearset 30 is disposed between planetary gearset 26 and 28. Those torque-transmitting mechanisms that are identical with FIG. 1 have the same numerical designation.

As shown in FIG. 8, sun gear member 60 is continuously connected with housing 54 through a shaft 93G that traverses zones D and E. Alternatively, shaft 93G could traverse through zone E only and connect to sidewall 52. Further, torque-transmitting mechanisms 34 and 36 are disposed in zone "A". The torque-transmitting mechanism 40 is disposed in zone "B". Further, torque-transmitting mechanism 32 is disposed in zone "C". The torque transmitting mechanism 38 is disposed in zone "D". The torque-transmitting mechanism 42 is disposed in zone "E". This makes for a fairly compact transverse power transmission.

Alternatively, the present invention contemplates that torque-transmitting mechanisms 32, 34, 36, 38, 40, and 42, are disposed in the other zones as shown in chart (VIII) below, in accordance with the embodiments of the present invention. An "X" in the chart shown below indicates that the particular clutch is positionable in any of the referenced Zones and an "O" indicates that the particular gear is not to be located in the referenced Zones.

CHART VIII

| TORQUE TRANSMITTING MECHANISM | ZONES | | | | |
|---|---|---|---|---|---|
| | A | B | C | D | E |
| 32 | X | X | X | O | O |
| 34 | X | X | O | O | X |
| 36 | X | X | O | O | X |
| 38 | O | O | X | X | X |
| 40 | O | X | X | O | X |
| 42 | O | X | X | X | X |

Figure 9:
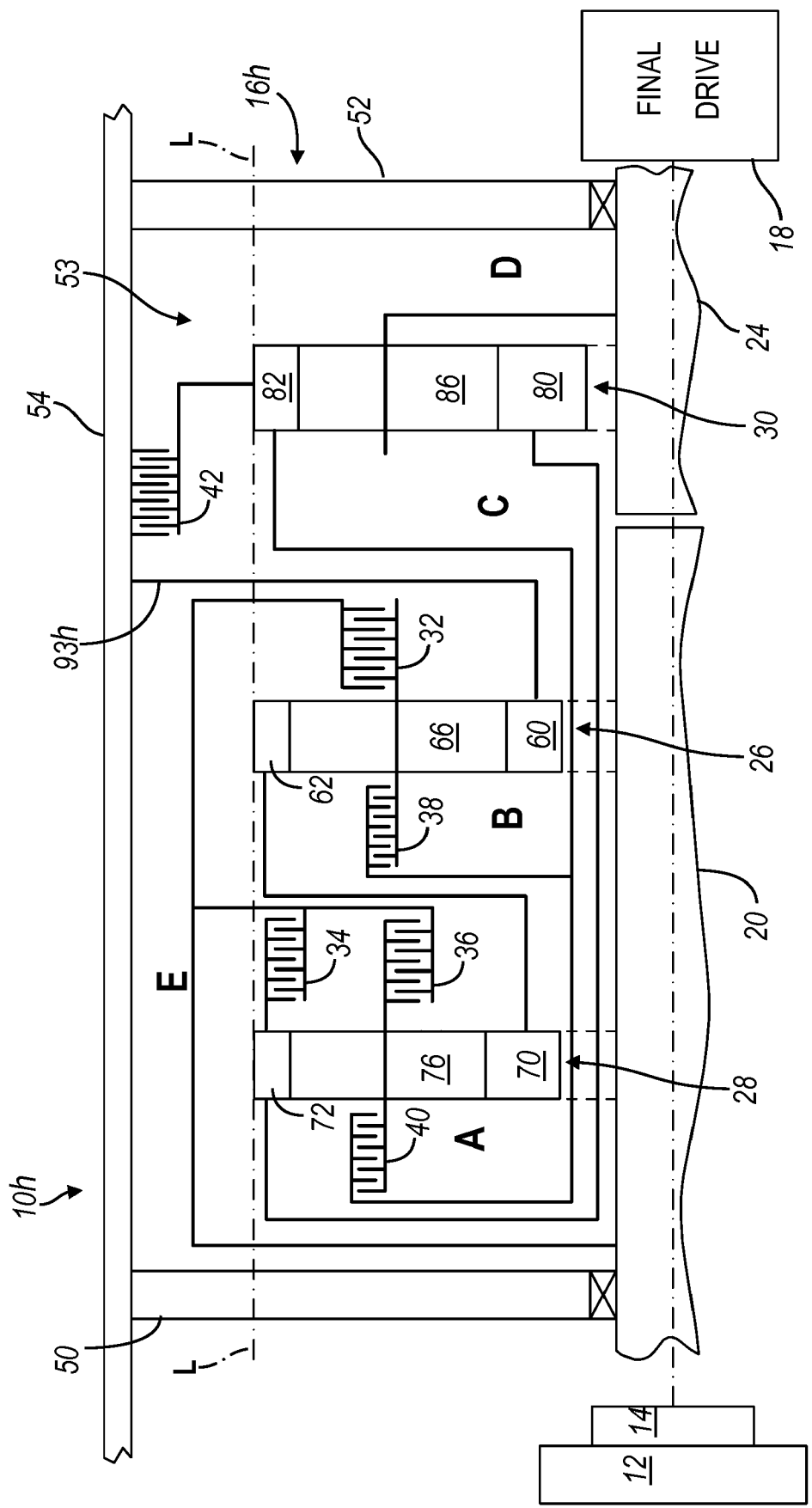
FIG. 9 is a diagrammatic representation of a cross-section of a multi-speed transmission, in accordance with an embodiment of the present invention.

In an alternate embodiment of the present invention, a powertrain 10H shown in FIG. 9, incorporates a transmission 16H. Transmission 16H includes the planetary gearsets 26, 28, and 30 and the torque-transmitting mechanisms 32, 34, 36, 38, 40 and 42. Planetary gearset 28 is disposed closest to wall 50 and planetary gearset 30 is disposed closest to wall 52. Planetary gearset 26 is disposed between planetary gearset 28 and 30. Those torque-transmitting mechanisms that are identical with FIG. 1 have the same numerical designation.

As shown in FIG. 9, sun gear member 60 is continuously connected with housing 54 through a shaft 93H that traverses zones C and E. Further, torque-transmitting mechanism 40 is disposed in zone "A". The torque-transmitting mechanisms 34, 36 and 38 are disposed in zone "B". Further, torque-transmitting mechanism 32 is disposed in zone "C". The torque-transmitting mechanism 42 is disposed in zone "E". This makes for a fairly compact longitudinal power transmission.

Alternatively, the present invention contemplates that torque-transmitting mechanisms 32, 34, 36, 38, 40 and 42, are disposed in the other zones as shown in chart (IX) below, in accordance with the embodiments of the present invention. An "X" in the chart shown below indicates that the particular clutch is positionable in any of the referenced Zones and an "O" indicates that the particular gear is not to be located in the referenced Zones.

CHART IX

| TORQUE TRANSMITTING MECHANISM | ZONES | | | | |
|---|---|---|---|---|---|
| | A | B | C | D | E |
| 32 | X | X | X | O | X |
| 34 | X | X | X | O | X |
| 36 | X | X | X | O | X |
| 38 | O | X | X | X | X |
| 40 | X | X | X | X | X |
| 42 | O | O | X | X | X |

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A transmission comprising:
an input member;
an output member;
a transmission housing having a first wall, a second wall, and a third wall extending between the first and second walls;
a first, second, and third planetary gear set disposed within the transmission housing, wherein the first planetary gear set is adjacent the first wall, the third planetary gear set is adjacent second wall, and the second planetary gear set is between the first and third planetary gear sets, each planetary gear set having a sun gear member, a ring gear member, and a planet carrier member supporting a plurality of planet gears each configured to intermesh with both the sun gear member and the ring gear member, wherein the output member is continuously interconnected with the planet carrier member of the third planetary gear set, wherein the ring gear member of the first planetary gear set is permanently coupled to the sun gear member of the second planetary gear set, and wherein the sun gear member of the first planetary gear set is permanently coupled to the transmission housing;
wherein the transmission housing has a first area defined radially inward from an outer periphery of the planetary gear sets and axially bounded by the first wall and the first planetary gear set, a second area defined radially inward from the outer periphery of the planetary gear sets and axially bounded by the first and second planetary gear sets, a third area defined radially inward from the outer periphery of the planetary gear sets and axially bounded by the second and third planetary gear sets, a fourth area defined radially inward from the outer periphery of the planetary gear sets and axially bounded by the third planetary gear set and the second wall, and a fifth area defined radially inward from the third wall and radially outward from the outer periphery of the planetary gear sets and axially bounded by the first wall and the second wall;
a first clutch selectively engageable to interconnect the input member with the planet carrier member of the first planetary gear set;
a second clutch selectively engageable to interconnect the input member with the ring gear member of the second planetary gear set and the sun gear member of the third planetary gear set;

a third clutch selectively engageable to interconnect the input member with the planet carrier member of the second planetary gear set;

a fourth clutch selectively engageable to interconnect the planet carrier member of the first planetary gear set with the ring gear member of the third planetary gear set;

a fifth clutch selectively engageable to interconnect the planet carrier member of the second planetary gear set with the ring gear member of the third planetary gear set;

a first brake selectively engageable to interconnect the ring gear member of the third planetary gear set to the transmission housing;

wherein the first clutch is located in at least one of the first, second, and third areas, the second clutch is located in the first area, the third clutch is located in at least one of the first, second, and third areas, the fourth clutch is located in at least one of the first, second, third, fourth, and fifth areas, the fifth clutch is located in at least one of the second, third, fourth, and fifth areas, and the first brake is located in at least one of the first, second, third, fourth, and fifth areas; and wherein the clutches and brakes are selectively engageable to establish at least eight forward speed ratios and at least one reverse speed ratio between the input member and the output member.

2. The transmission of claim 1 wherein the first clutch is located in the second area, the third clutch is located in the third area, the fourth clutch is located in the fifth area, the fifth clutch is located in the second area, and the first brake is located in the fifth area.

3. The transmission of claim 1 wherein the first clutch is located within the first area.

4. The transmission of claim 1 wherein the first clutch is located within the second area.

5. The transmission of claim 1 wherein the first clutch is located within the third area.

6. The transmission of claim 1 wherein the third clutch is located within the first area.

7. The transmission of claim 1 wherein the third clutch is located within the second area.

8. The transmission of claim 1 wherein the third clutch is located within the third area.

9. The transmission of claim 1 wherein the fourth clutch is located within the first area.

10. The transmission of claim 1 wherein the fourth clutch is located within the second area.

11. The transmission of claim 1 wherein the fourth clutch is located within the third area.

12. The transmission of claim 1 wherein the fourth clutch is located within the fourth area.

13. The transmission of claim 1 wherein the fourth clutch is located within the fifth area.

14. The transmission of claim 1 wherein the fifth clutch is located within the second area.

15. The transmission of claim 1 wherein the fifth clutch is located within the third area.

16. The transmission of claim 1 wherein the fifth clutch is located within the fourth area.

17. The transmission of claim 1 wherein the fifth clutch is located within the fifth area.

18. The transmission of claim 1 wherein the first brake is located within the first area.

19. The transmission of claim 1 wherein the first brake is located within the second area.

20. The transmission of claim 1 wherein the first brake is located within the third area.

21. The transmission of claim 1 wherein the first brake is located within the fourth area.

22. The transmission of claim 1 wherein the first brake is located within the fifth area.

23. A transmission comprising:

an input member;

an output member;

a transmission housing having a first wall, a second wall, and a third wall extending between the first and second walls;

a first, second, and third planetary gear set disposed within the transmission housing, wherein the first planetary gear set is adjacent the first wall, the third planetary gear set is adjacent second wall, and the second planetary gear set is between the first and third planetary gear sets, each planetary gear set having a sun gear member, a ring gear member, and a planet carrier member supporting a plurality of planet gears each configured to intermesh with both the sun gear member and the ring gear member, wherein the output member is continuously interconnected with the planet carrier member of the third planetary gear set, wherein the ring gear member of the first planetary gear set is permanently coupled to the sun gear member of the second planetary gear set, and wherein the sun gear member of the first planetary gear set is permanently coupled to the transmission housing;

wherein the transmission housing has a first area defined radially inward from an outer periphery of the planetary gear sets and axially bounded by the first wall and the first planetary gear set, a second area defined radially inward from the outer periphery of the planetary gear sets and axially bounded by the first and second planetary gear sets, a third area defined radially inward from the outer periphery of the planetary gear sets and axially bounded by the second and third planetary gear sets, a fourth area defined radially inward from the outer periphery of the planetary gear sets and axially bounded by the third planetary gear set and the second wall, and a fifth area defined radially inward from the third wall and radially outward from the outer periphery of the planetary gear sets and axially bounded by the first wall and the second wall;

a first clutch selectively engageable to interconnect the input member with the planet carrier member of the first planetary gear set;

a second clutch selectively engageable to interconnect the input member with the ring gear member of the second planetary gear set and the sun gear member of the third planetary gear set;

a third clutch selectively engageable to interconnect the input member with the planet carrier member of the second planetary gear set;

a fourth clutch selectively engageable to interconnect the planet carrier member of the first planetary gear set with the ring gear member of the third planetary gear set;

a fifth clutch selectively engageable to interconnect the planet carrier member of the second planetary gear set with the ring gear member of the third planetary gear set;

a first brake selectively engageable to interconnect the ring gear member of the third planetary gear set to the transmission housing;

wherein the first clutch is located in at least one of the first, second, and third areas, the second clutch is located in the second area, the third clutch is located in at least one of the first, second, and third areas, the fourth clutch is located in at least one of the first, second, third, fourth, and fifth areas, the fifth clutch is located in at least one of the second, third, fourth, and fifth areas, and the first brake is located in at least one of the first, second, third, fourth, and fifth areas; and wherein the clutches and brakes are selectively engageable to establish at least eight forward speed ratios and at least one reverse speed ratio between the input member and the output member.

* * * * *